INVENTOR.
Martin C. Schwichtenberg

Sept. 14, 1965

M. C. SCHWICHTENBERG 3,206,044

ORBITAL SILAGE DISTRIBUTOR

Filed Dec. 9, 1963

INVENTOR.
Martin C. Schwichtenberg
BY Stanley C. Biniak
ATTORNEY

United States Patent Office

3,206,044
Patented Sept. 14, 1965

3,206,044
ORBITAL SILAGE DISTRIBUTOR
Martin C. Schwichtenberg, Nasewaupee, Wis.
(Rte. 4, Sturgeon Bay, Wis.)
Filed Dec. 9, 1963, Ser. No. 329,068
12 Claims. (Cl. 214—17)

This invention relates generally to silage distributors for filling tower silos, and more particularly an orbital silage distributor having coacting rotary fan means moving in orbital revolution.

The purpose of this invention is to provide a silage distributor that distributes the various sizes of the silage particles more uniformly throughout the silage mass.

Improper filling of a tower silo can cause separation and segregation of the variously sized silage particles and cause spoilage. Loose and uneven compaction of silage can result in heating, moulding, and nutrient losses. Furthermore, improper filling can cause uneven wall pressures that can cause serious damage to a silo, even to the point of overturning a silo. In addition, it is estimated that improper filling can reduce the capacity of a silo by as much as 15%.

The present improved silage distributor corrects the above deficiencies by providing means for uniformly and evenly distributing the silage particles in the silo.

An object of this invention is the provision of a silage distributor that achieves a dense silage mass.

Another object is to provide a silage distributor that achieves a relatively air free compaction of the silage mass.

Still another object of this invention is the provision of a silage distributor that achieves optimum silage fermentation.

Yet another object is to provide coacting orbital fans for distributing silage.

A further object of this invention is the provision of means in a silage distributor for orbitally driving a fan.

Still a further object is to provide silage distributor means including an orbital centrifugal blower fan.

Yet a further object of this invention is to provide silage distributor means including an orbital silage retarding fan.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
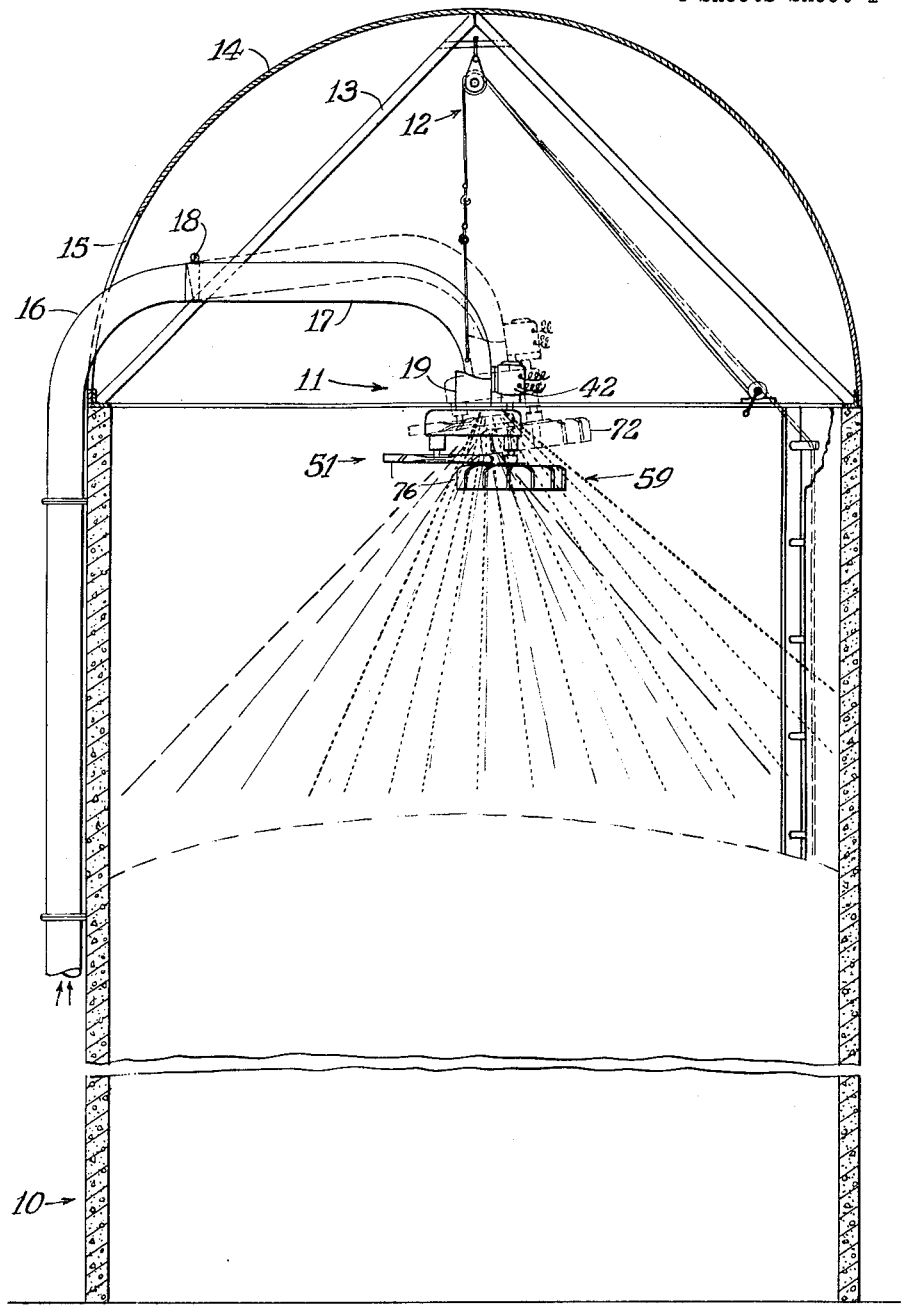
FIG. 1 is a vertical section view through a silo showing the present improved silage distributor invention operatively mounted therein.

Referring now to the drawings, wherein like reference numerals designate like or corresponding parts throughout the several views, there is shown in FIG. 1 a tower silo generally indicated at 10 having the present silage distributor invention, generally indicated at 11, suspended by block and tackle means 12, from a tripod 13 mounted on the top of the silo wall. The domed roof 14 of the silo is provided with the usual opening 15 to permit the insertion of the discharge end of a blower conveyor tube 16 through which the silage is carried from a cutter machine at the foot of the silo, to the top of the silo, in a manner well known. A hood-spout 17 cmmunicates with the discharge end of the conveyor tube 16 and conducts the silage to the distributor apparatus of the present invention generally indicated at 11. Said hood-spout 17 is hingedly connected to said conveyor tube 16, as at 18, for movement up and down about the hinge axis.

The distributor 11 comprises a support sleeve 19 the upper end portion of which surrounds the discharge end of the conveyor spout 17 and is secured thereto as by bolt and nut means 20 and 21.

The support sleeve 19 is provided with a tubular extension 22 surrounding the lower end portion of said sleeve 19 and secured thereto as by welding.

Figure 2:
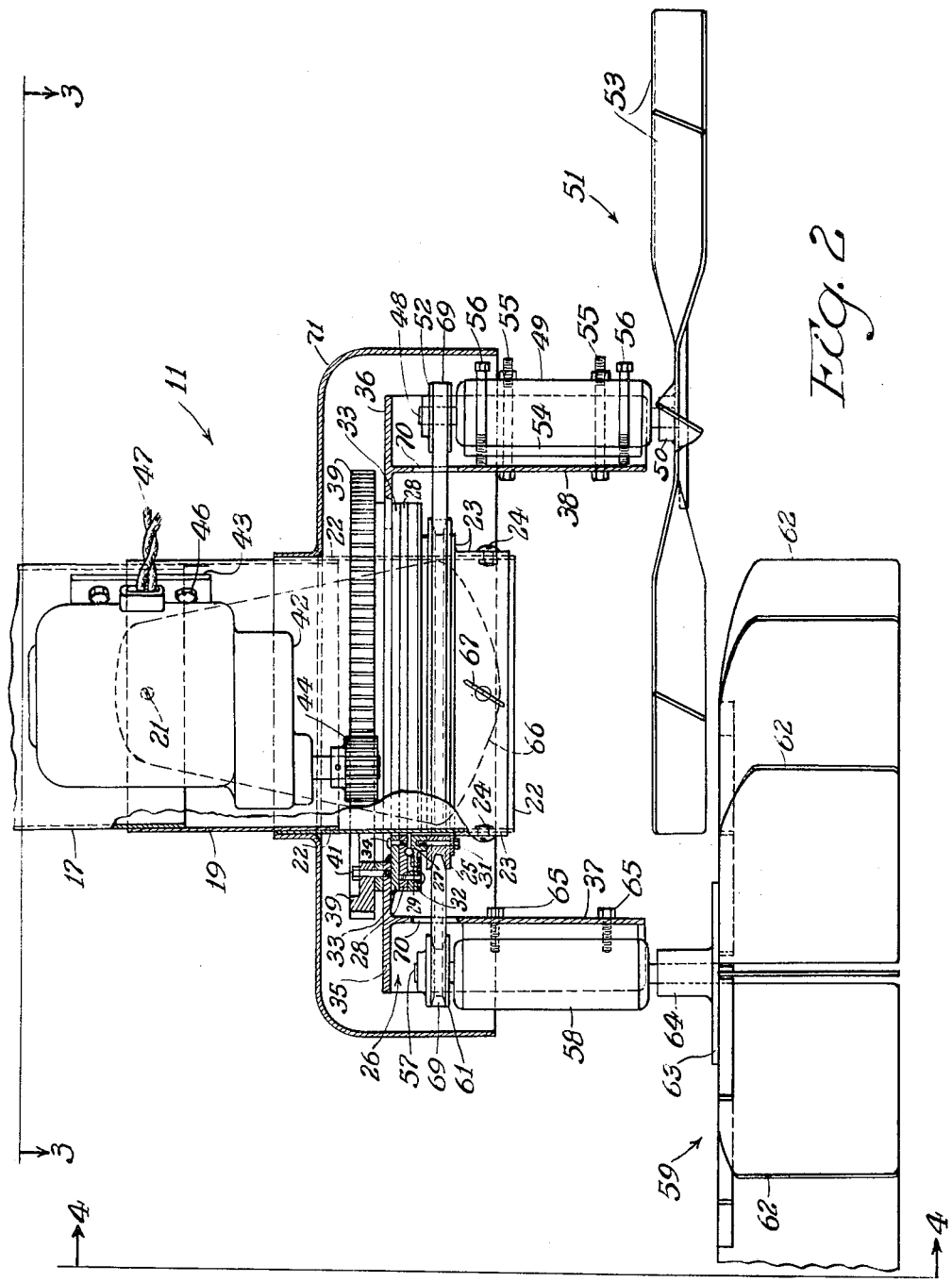
FIG. 2 is an enlarged front elevation view, partly in section, of the silage distributor apparatus, per se, shown in FIG. 1.
Figure 3:
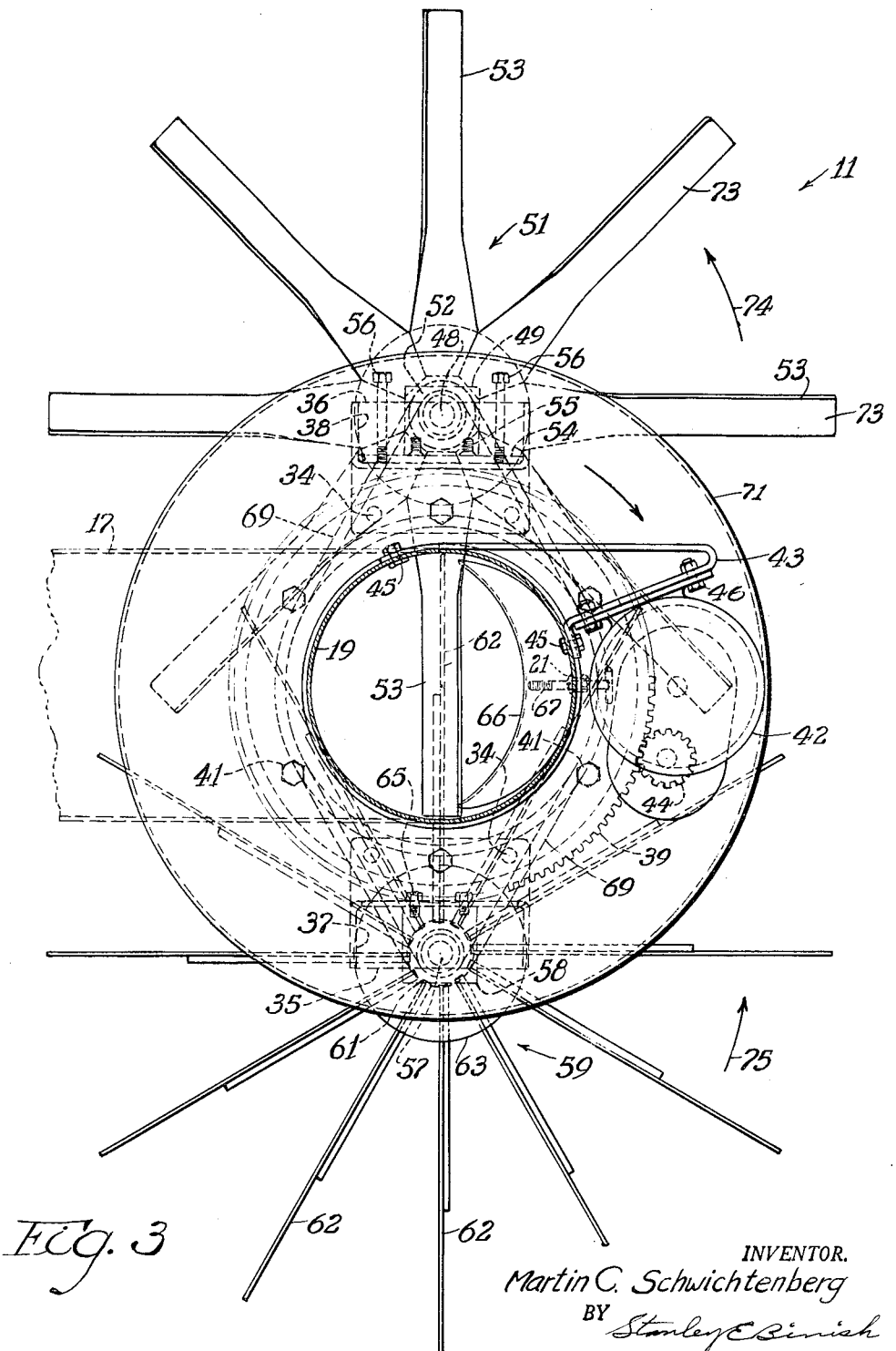
FIG. 3 is a section view taken on line 3—3 of FIG. 2.

A flange support ring 23 is disposed around the bottom portion of tubular extension 22 and is secured thereto as by bolt and nut means 24, see FIG. 2.

Disposed around said tubular extension 22, and carried on said flanged support ring 23, is a ring sheave 25.

A ball bearing arrangement generally indicated at 26 is disposed around said tubular extension 22 and is mounted on said sheave 25. The ball bearing arrangement comprises a fixed lower race 27 and a rotatable upper race 28 and balls 29 therebetween.

Screw means, such as indicated at 31, fixes the sheave 25 and lower race 27 to the flange of the support ring 23.

A retainer ring 32, surrounding said upper race and having a lip engageable with the underside of the lower race 27, is fixed to the upper race 28 by screw means and rotates therewith.

A fan support ring 33, disposed around tubular extension 22 and mounted on the upper race 28 is fixed to the upper race by means such as screw 34 to rotate with said upper race. Diametrically opposite arms 35 and 36 are welded to said fan support ring.

Depending from said arms 35 and 36 are oppositely disposed bracket or channel hangers 37 and 38, respectively, for carrying fan bearings hereinafter described.

A ring gear 39 is carried on the fan support ring 33 and fixed thereto as by screws such as indicated at 41.

A gear motor 42, mounted on bracket 43, is provided with an output pinion 44 which enmeshes with ring gear 39 for driving said ring gear. The bracket 43 is fixed to the support sleeve 19 by bolt and nut means such as indicated at 45. The motor 42 is fixed on the bracket 43 by bolt and nut means such as indicated at 46, and is connectable to a source of line voltage through means of electrical conductors 47.

A vertical fan shaft 48, rotatably mounted in bearing 49, is provided with a fan wheel generally indicated at 51 fixed to the lower end of said shaft and a sheave 52 fixed to the upper end of such shaft. The fan wheel is provided with a plurality of pitched blade vanes, such as indicated at 53, welded to a flanged hub 50 and extending radially therefrom.

The bearing 49 is mounted on a plate 54 and disposed between the flanges of channel hanger 38. It is mounted on said hanger through means of bolts such as indicated at 55. Adjustment screws such as indicated at 56 are threadedly engaged through said plate 54 and butt against the web of channel hanger 38. The adjustment screws function to move plate 54 and bearing 49 thereon whereby to tighten a belt as hereinafter described. The nuts on bolts 55 are tightened or loosened to accommodate the adjustment function of adjustment screws 56.

A somewhat similar second vertical shaft 57 is rotatably monuted in bearing 58 and is provided with a paddle or fan wheel generally indicated at 59 fixed to the lower end of said shaft and a sheave 61 fixed to the upper end thereof. The fan wheel 59 is provided with a plurality of paddles or plane vanes 62 having their inner ends disposed longitudinally of said shaft 57, and welded onto the flange 63 of a hub 64 fixed on shaft 57 to rotate therewith. Said vanes, uniformly angularly spaced, extend radially of shaft 57.

The fan wheels 51 and 59 are disposed so that one overlaps the other, that is, the outer end portions of vanes 53 are spaced above and overlap the outer end portions of vanes 62; and such overlapped portions are disposed directly under and spaced from the discharge end of tubular extension 22. In other words the vanes are related whereby vanes 62 underlap the overlapping vanes 53.

The bearing 58 is fixed to the web of channel hanger 37 by means of screws such as indicated at 65.

Figure 4:
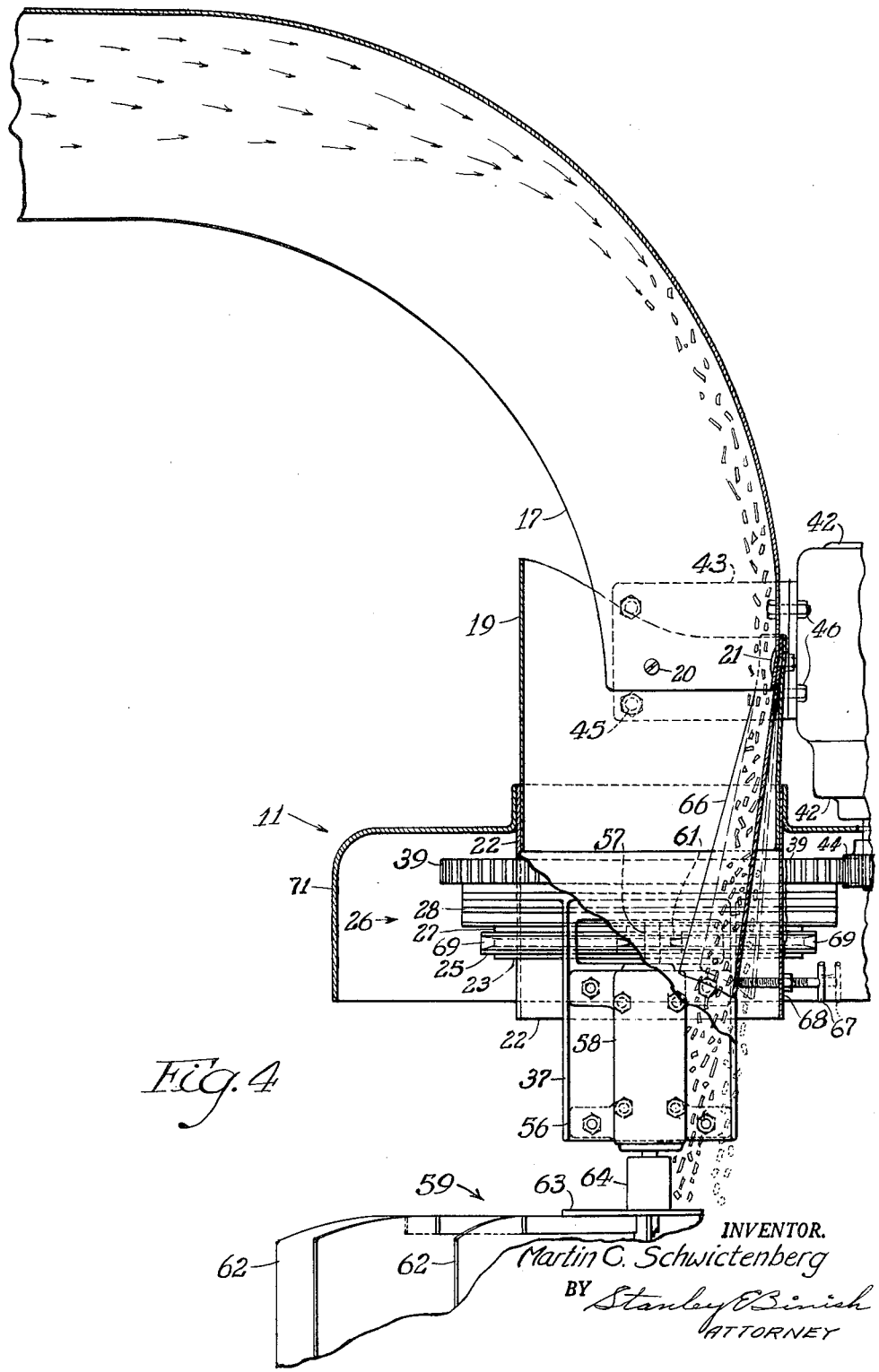
FIG. 4 is a partial elevation view, with parts broken away, as viewed from line 4—4 of FIG. 2.

A resilient deflector plate 66, disposed in sleeve 19 and extension 22, has its upper end secured to the upper end of support sleeve 19 by screw and nut means 21, and its lower end biased against the end of deflector adjustment screw 67 which is threadedly engaged through said tubular extension 22 as at 68, see FIG. 4.

A V-belt 69 is trained around large ring sheave 25 and smaller twin sheaves 52 and 61 on opposite sides thereof so that said belt surrounds said grouped sheaves. Openings such as indicated at 70 are provided in hangers 37 and 38 to allow the V-belt to pass threrethrough.

A dome-like cover guard 71, centrally apertured, is disposed to surround the top end of tubular extension, is fixed thereto as by welding, and extends downwardly to the lower end of said tubular extension to provide an umbrella-like cover over the gear and ring means therebelow, said guard extending outwardly to cover the fan sheaves and bearings.

*Operation*

At silo filling time the distributor 11 which hood-spout 17 attached thereto is raised to the top of the inside of the silo and suspended there by means of block and tackle means 12 and pivotally connected to the upper end of conveyor tube by hinge means 18.

Normally the distributor is poised substantially centrally of the silo, and directed directly downwardly as indicated by the solid line position 76, see FIG. 1.

However, the hinged connection 18 provides adjustment control of the distributor to allow a positionment centrally or eccentrically of the silo, such as indicated by the dotted line position 72.

When motor 42 is energized, its pinion drives ring gear 39 in rotation around tubular extension 22. As said ring gear rotates, it carries with it fan support ring 33 supportably mounted on upper race 28 of ball bearing arrangement 26.

The fan wheels 51 and 59, fixed on and movable with said support ring 33, revolve around the axis of the tubular extension 22, at the discharge end thereof, in orbital revolution, the fan vanes under the discharge opening being in spaced overlapped relation.

The large ring sheave 25 and the lower race 27 of ball bearing arrangement are fixed and motionless on the tubular extension 22.

As the fan wheels orbit about the axis of the tubular extension 22, they are caused to rotate about their own axis through means of V-belt 69 being trained therearound. It is to be noted that V-belt 69 does not rotate. Rotation is imparted to the associated fan shafts by means of fan sheaves 52 and 61 being caused to roll on and along V-belt 69.

Silage conducted by the conveyor to the hood-spout 17 is conveyed therealong and discharged therefrom into the overlapped vanes of fan wheels 51 and 59.

Obviously, the speed of the fans can be varied to accommodate different diameter silos, or to change the pattern of silage distribution. In a twelve feet diameter silo it has been found desirable to provide a distribution pattern to form a build-up of silage, at the central portion of the silo, of from one to two feet above the silage at the wall of the silo.

Said discharged silage first encounters the trailing back or top sides 73 of pitched and overlap vanes 53, the fan wheel 51 being rotated counterclockwise in the direction of arrow 74 to force air downwardly. An effect of such encounter is not to deliver a blow or impact to the falling silage, as would be the case if the pitched blades were rotated clockwise, but the effect is to impede or retard the fall of the silage.

Thereafter the retarded silage falls between the underlap paddle vanes 62 of wheel 59 and into contact with the vertical faces of said vanes whereby an effect is to generate a centifugal force to act upon the particles of silage, to scatter said particles outwardly, and in conjunction with gravity, downwardly. Fan wheel 59 rotates counterclockwise in a direction indicated by arrow 75.

While the larger and heavier stalk particles are centrifugally thrust farther from the center of rotation of the fan 59 than the smaller and lighter particles, the end result is an improved distribution of the larger sized particles over the silage reception area because of the orbital movement of the fan over the entire reception area.

In addition it is to be noted that while some of the larger stalk particles are flung centrifugally outwardly by the fan blades, others of such particles drop directly downwardly between the blades to the central portion of the silo; and while some of the smaller lighter and leafy particles are acted upon to a lesser degree by the centrifugal force and drop substantially downwardly to the central portion of the silo, others of such small and leafy particles are blown outwardly by the blower action of the fan wheel 59 to mingle with the larger heavier particles, thereby achieving a uniform mixture of variously sized particles.

It is the combination of the rotational and orbital movements of the fans, and the blower action of the fan 59, that accomplishes the optimum distribution and compaction of variously sized particles and the resulting silage pack.

In the event the silage is not being delivered, by the hood-spout, directly onto the overlapped vane portions of the fan wheels, the deflector 66 can be adjusted inwardly or outwardly, through means of screw 67, to direct the silage directly onto such overlapped vane portions.

Some characteristic features of this invention are the provision of a silage distributor including orbital fans; the provision of a silage distributor including an orbital silage retarding fan; the provision of a silage distributor including an orbital centrifugal blower fan; the provision of a silage distributor including coacting overlapped orbital fans; the provision of means for driving a silage distributor fan rotatably and orbitally; the provision of means for controllably tilting a silage distributor to a position eccentrically of a silo; and deflector means in a silage distributor for controllably deflecting silage onto overlapped mixing vanes.

Obviously many modifications and variations of the present invention are possible in the light of the above teachings. It is therefore to be understood, that within the scope of the appended claims, the invention may be practiced otherwise than as specifically described.

What is claimed and desired to be protected by United States Letters Patent is:

1. In a silage distributor, comprising: support means; endless driven means mounted on said support means to revolve thereon; and a plurality of rotatable fan means fixed on said endless driven means in diametrically opposite relation with respect to said endless driven means, the vanes of said fan means being disposed in overlapped relation.

2. A silage distributor, comprising: tubular support means having an open discharge end; bearing means disposed around said tubular support means and fixed thereto; endless driven means mounted on said bearing means to revolve thereon; drive means for said driven means; a plurality of rotatable fan means fixed on said endless driven means in diametrically opposite relation with respect to said endless driven means, the vanes of said fan means being movable under the open discharge end of said tubular support means in overlapped relation, whereby silage passing through said tubular support means is directed onto the overlapped vanes; and means for driving said fan means.

3. A silage distributor, comprising: tubular support means having an open discharge end; bearing means disposed around said tubular support means and fixed thereto; endless gear means disposed around said tubular support means and mounted on said bearing means to revolve around said tubular support means; drive means mounted on said tubular support means for driving said endless gear means; diametrically opposite hanger means fixed on said endless gear means; first rotatable fan means mounted on one of said hanger means, and second rotatable fan means mounted on the other of said hanger means, the axis of rotation of said fan means being disposed parallel to the axis of said tubular support means, said first fan means having vanes movable under the open discharge end of said tubular support means and said second fan means having vanes movable under the open discharge end of said tubular support means and under the vanes of said first fan means in under-lapped relation, whereby silage passing through said tubular support means is directed onto the overlapped vanes; and means for driving said fan means.

4. A silage distributor, comprising: tubular support means having an open inlet end and an open discharge end; bearing means disposed around said tubular support means and fixed thereon; endless driven means mounted on said bearing means to revolve thereon; drive means for said endless driven means; substantially diametrically opposite bracket means mounted on said endless driven means to revolve therewith; first shaft means rotatably mounted on one of said bracket means, and second shaft means rotatably mounted on the other of said bracket means, the axes of rotation of said shaft means being parallel to the axis of said tubular support means; vanes mounted on the lower end portions of said shaft means, said vanes being disposed under the discharge end of said tubular support means in a relation whereby the vanes on one of said shaft means underlaps the overlapping vanes on the other of said shaft means; and means for driving said shaft means.

5. The apparatus of claim 4 wherein the bearing means comprises annular bearing means, and wherein the endless driven means comprises annular driven means.

6. The apparatus of claim 4 wherein the bearing means is a ring bearing, the endless driven means is a toothed ring gear, and the drive means is a motor mounted on said tubular support means and having a toothed pinion drivably engaged with said toothed ring gear.

7. The apparatus of claim 4 wherein the bracket means comprise hanger means depending from the endless driven means.

8. The apparatus of claim 4 wherein the underlap vanes comprise substantially plane vanes having their inner ends disposed longitudinally of its shaft means.

9. The apparatus of claim 4 wherein the overlap vanes are pitched and rotated in a direction to force air downwardly.

10. The apparatus of claim 4 wherein the means for driving said shaft means comprise gearing means interconnecting said shaft means.

11. The apparatus of claim 4 wherein the means for driving said shaft means comprise belt gearing trained around said shaft means.

12. The apparatus of claim 4 wherein the means for driving said shaft means comprise a sheave disposed around and fixed to said tubular support means, and belt means trained around said sheave and shaft means.

References Cited by the Examiner
UNITED STATES PATENTS 3,065,842   11/62   Nowak _____ 198—128

HUGO O. SCHULZ, *Primary Examiner.*